L. J. ENGLUND.
COMBINATION SHIP BEVEL, MITER SQUARE, CALIPERS, AND RULE.
APPLICATION FILED JUNE 3, 1920.
1,379,090.
Patented May 24, 1921.
3 SHEETS—SHEET 1.
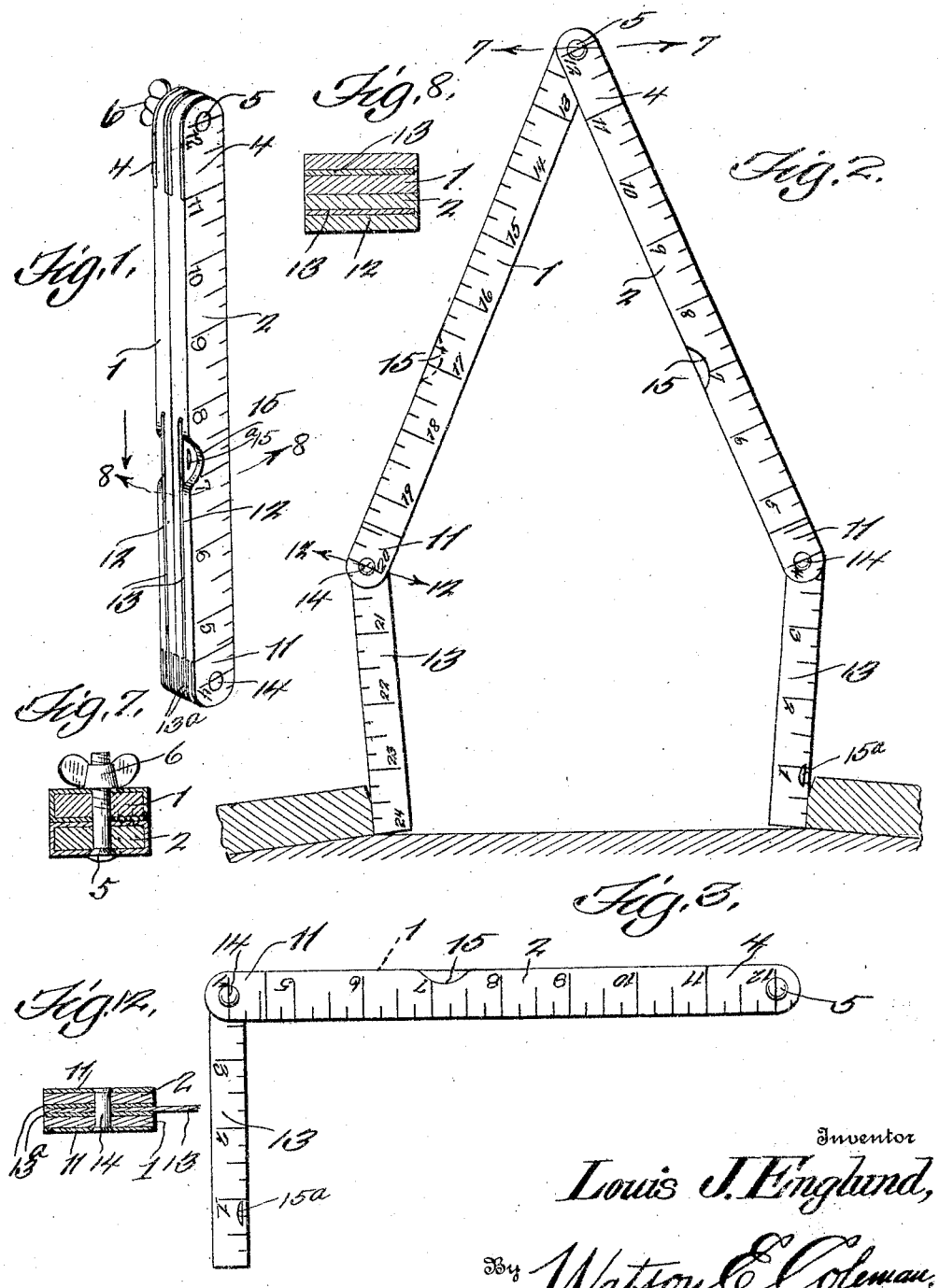
Inventor
Louis J. Englund,
By Watson E. Coleman,
Attorney L. J. ENGLUND.
COMBINATION SHIP BEVEL, MITER SQUARE, CALIPERS, AND RULE.
APPLICATION FILED JUNE 3, 1920.
1,379,090.
Patented May 24, 1921.
3 SHEETS—SHEET 2.
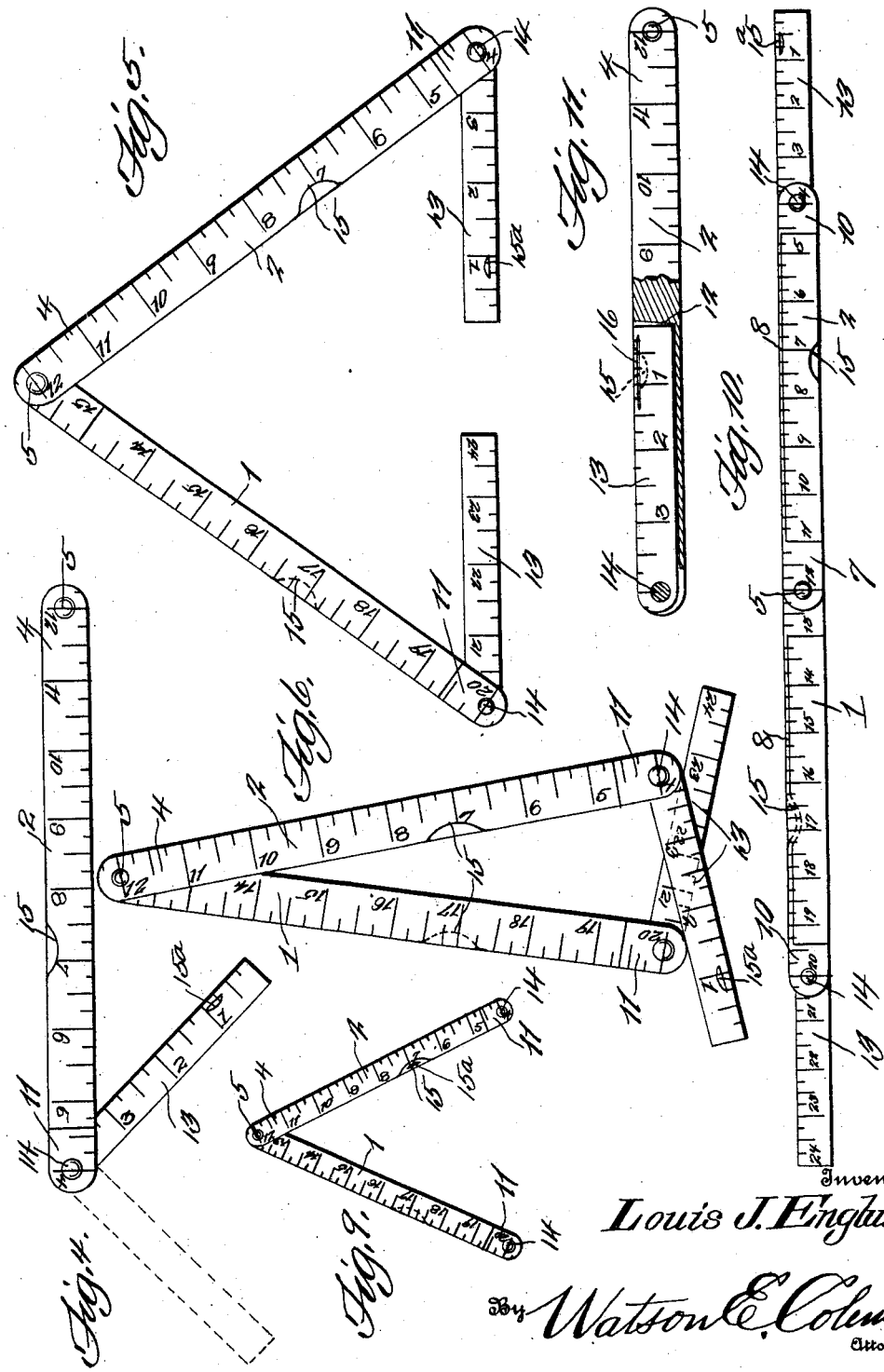
Inventor
Louis J. Englund,
By Watson E. Coleman,
Attorney L. J. ENGLUND.
COMBINATION SHIP BEVEL, MITER SQUARE, CALIPERS, AND RULE.
APPLICATION FILED JUNE 3, 1920.
1,379,090.
Patented May 24, 1921.
3 SHEETS—SHEET 3.
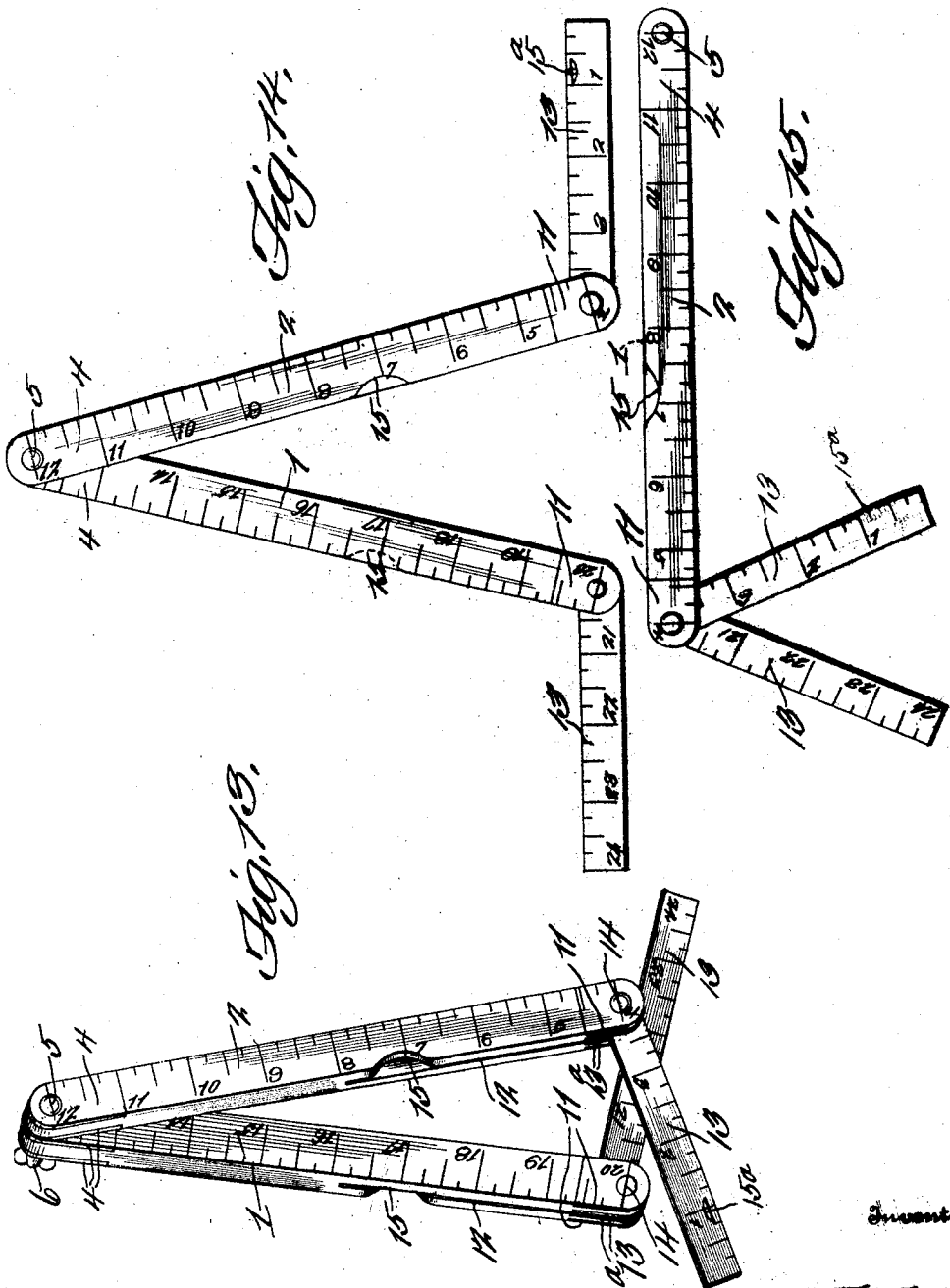

UNITED STATES PATENT OFFICE.

LOUIS J. ENGLUND, OF OAKLAND, CALIFORNIA.

COMBINATION SHIP-BEVEL, MITER-SQUARE, CALIPERS, AND RULE.

1,379,090.  Specification of Letters Patent.  Patented May 24, 1921.

Application filed June 3, 1920. Serial No. 386,300.

*To all whom it may concern:*

Be it known that I, LOUIS J. ENGLUND, a citizen of the United States, residing at Oakland, in the county of Alameda and State of California, have invented certain new and useful Improvements in Combination Ship-Bevels, Miter-Squares, Calipers, and Rules, of which the following is a specification, reference being had to the accompanying drawings.

This invention relates to an improved combination measuring instrument such as a ship bevel, miter square, calipers and a rule, and an object is to provide a very simple practical and compact tool of this kind capable of being cheaply made and sold at a reasonable profit.

Another object is to provide a device for ascertaining the angle of bevel and the width of planks in the construction of the hull or deck of a ship, in one measurement, and also to ascertain the measurement on a shutter place, by arranging the parts of the measuring tool as shown in Figure 1 with the ends of the tongues of the tool adjacent the rib and the edges of the planks, after which a thumb nut is tightened to hold the main parts of the instrument in the positions assumed, and then transfer the measurement and the angle of bevel to the batten or bevel board, which will give the width of the plank and also both bevels all in one measurement, thereby saving considerable time and labor.

Still another object is to provide an instrument which may be used as a miter square or as calipers, and also as a rule, preferably, though not necessarily, of a two-foot length.

A further object consists in the provision of a measuring instrument wherein certain of the members or sections of the instrument are foldable within other of the members or sections of the instrument, and furthermore to provide an instrument wherein the ends of the members or sections thereof are lined or covered with metallic shields, preferably brass. In more expensive instruments, where it is necessary to make a rigid, more serviceable and durable tool and to insure strength, it is the aim to line the edges of the major sections of the measuring instrument with metal or to provide an entire shield for the major sections or members of the instrument, so as to protect the same.

If necessary, the major sections or members may be made entirely of metal.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Fig. 1 is a perspective view of the instrument showing the parts or sections thereof folded, Fig. 2 is a view showing the instrument as applied for ascertaining the width and the bevels of a plank in one measurement so as to fit the shutter plank, Fig. 3 is a view showing the sections or members of the measuring instrument disposed, whereby the instrument may be used as a miter square so as to ascertain the bevels on boards or planking to be used in the construction of ships and the like, Fig. 4 is a view showing the instrument used as a common bevel with one of the small sections or tongues of the instrument, Fig. 5 is a view showing the instrument used as outside calipers, Fig. 6 is a view showing the instrument used as inside calipers.

Fig. 7 is a cross sectional view on line 7—7 of Fig. 2,

Fig. 8 is a cross sectional view on line 8—8 of Fig. 1,

Fig. 9 is a view showing the parts of the instrument disposed in a different manner so that the same can be used as inside and outside calipers, Fig. 10 is a view of the device showing the parts disposed in alinement so that the instrument can be used as a rule, Fig. 11 is a plan view showing the dominant members closed, and the member 2 partly in section, showing a slot or cavity as receiving the auxiliary section 13 of said member 2, Fig. 12 is a sectional view on line 12—12 of Fig. 2.

Fig. 13 is a perspective view of the arrangement of the measuring instrument as shown in Fig. 6;

Fig. 14 is a view showing the instrument used in another way for inside calipers;

Fig. 15 is a view showing the instrument used as inside and outside calipers;

Referring to the drawings, 1 and 2 designate major or dominant members of the measuring instrument, and the end portions 3 of which have countersunk in their opposite faces metallic plates 4, preferably of brass, though other metal may be used. By means of these plates, the ends of the sections or members 1 and 2 are reinforced and protected, so as to render the instrument durable. A bolt 5 passes through the ends 3 and through the metallic protecting plates 4 and is provided with a thumb nut 6 whereby the sections or members 3 may be held in various fixed positions. If necessary, the ends 3 may be entirely covered by means of metal, for instance, protecting sleeves 7 may be fitted over the ends, such as shown in Fig. 7. The sleeves 7 as shown in Fig. 10 may have metallic extensions 8 which are ararranged adjacent the edges of the sections or members 1 and 2 in order to protect the same, and render them more durable. These extensions 8 as shown in Fig. 10 merge into the protecting plates 10, which are carried by the other ends of the major sections or members of the measuring instrument.

However, in Figs. 1 and 8 the ends of the major sections or members of the measuring instrument remote from their pivotal connection have opposing protecting plates 11, preferably of brass, though other metal may be employed. The end portions of the major sections or members 1 and 2 of the instrument are provided with elongated slots 12, which are adapted to receive the tongues or auxiliary sections or members 13 of the measuring instrument. These tongues or auxiliary sections are designed to be constructed entirely of metal, though other material may be used. The tongues or auxiliary sections 13 are pivotally arranged between the ends of the major sections or members 1 and 2 and passing through the plate 11 or the plate 10 are pivot pins or rivets 14. These pins or rivets are held securely in place owing to their ends being either swaged or otherwise formed to bind against the plates 11 or the plates 10 so as to insure frictional engagement of the tongues or auxiliary sections 13 between the adjacent faces of the slots or grooves 12. In fact, the inner faces of the walls of the slots 12 adjacent the ends of the sections or members 1 and 2 are lined with metal 13ª, so that the tongues or auxiliary sections 13 are capable of being held in adjusted positions.

The auxiliary sections or members 13 are capable of being folded in order to engage the slots or grooves 12 and in this case, the sections or members 1 and 2 may be collapsed or folded adjacent each other, as shown in Fig. 1.

Referring to Fig. 2, it will be noted that the measuring instrument is employed for ascertaining the width of a space between planking and the bevels of the edges of the planking all in one measurement, while Fig. 3 shows the instrument or tool employed as a square.

In order to employ the instrument as a common bevel, the major sections or members 1 and 2 are disposed in parallelism, and after which one of the auxiliary sections or tongues 13 can be disposed as shown in full and dotted lines so that the instrument can be used either as a miter square or as a tool for ascertaining the bevels of various planking, or of hip and valley rafters.

If necessary, the instrument can be used for inside and outside calipers, as shown in Figs. 5 and 6, by disposing the tongues or auxiliary sections 13 in the positions shown in these figures. Also the instrument can be used as inside and outside calipers by employing the tool as shown in Fig. 9, which is partly similar to the use of the tool shown in Fig. 3. In this instance, the major sections or members 1 and 2 are disposed in parallelism, as in Fig. 4, and after which the two tongues or auxiliary sections are withdrawn from the slots or grooves in the major sections and disposed as shown in dotted and full lines.

It will be noted that when the tool is not in use the tongues or auxiliary sections can be arranged in the slots or grooves 12 with the major sections or members 1 and 2 in parallelism. By tightening up the thumb nut 6 on the pivot pin or bolt 5, the major sections or members 1 and 2 may be held in different positions and owing to there being sufficient friction between the adjacent surfaces of the parts binding the slots 12, the tongues or auxiliary sections 13 are held in different positions.

In Fig. 10 the parts of the instrument are disposed in alinement in order that the same may be used as a rule.

Certain of the major sections or members have cut away portions 15 to receive the thumb and finger so as to permit the thumb and finger to grasp the auxiliary sections so that they may be removed from the slots. The tongues or auxiliary sections may have elongated grooves 16 in which the nail of the thumb or finger may engage as in Fig. 11.

In Fig. 14 the dominant members are disposed at angles to each other and the auxiliary members are disposed outwardly, so that their ends may be used to engage inside opposite portions of an object, hence permitting the instrument to be used as inside calipers. In Fig. 15 the two dominant members are in parallel, and the two auxiliary members are disposed at angles to each other, whereby they may be employed as inside and outside calipers.

The auxiliary sections 13 are provided with notches or finger nail holes 15ª to be engaged by the nail of the finger so that the sections 13 may be opened. The cut away portions 15 may be constructed as shown or otherwise constructed, in other words positioned differently, say for instance, the cut away portion 15 of the section 1 may be adjacent the opposite edge and vice versa, or the cut away portion 15 of the dominant section 2 may be adjacent the opposite edge and vice versa.

The invention having been set forth, what is claimed as new and useful is:—

1. In a measuring instrument, major sections pivotally united with their flat side faces adjacent each other, said pivoted ends having protecting plates, means passing through the protecting ends of the major sections and provided with means for drawing the two sections tightly and frictionally together, tongues or auxiliary sections pivotally and frictionally connected to the other ends of the major sections and adapted to be disposed in alinement toward each other, whereby the instrument may be used as outside calipers, or disposed toward and intersecting each other, whereby the instrument may be used as inside calipers, the major sections having elongated slots in which the tongues or auxiliary sections are adapted to fold, whereby they may be protected.

2. In a measuring instrument, a pair of major members pivotally united with their flat side faces adjacent each other, means for pivoting and insuring frictional contact between the members, tongues movably and operatively connected to the other ends of the major sections, said major members adapted to be positioned in parallelism, and the tongues adapted to assume angular positions from and united with the major members, said tongues being adjustable so as to be used as inside and outside calipers, metallic protecting means for the ends of the major members, these being graduations on the major and auxiliary sections, whereby the instrument may be used as a rule when the major and top sections are disposed in alinement.

3. In a measuring instrument, major sections pivotally united at certain of their corresponding ends with their flat side faces adjacent each other whereby the major sections may move past each other, means carried by the pivotal connections between the two sections for holding the sections frictionally in different adjusted positions, said sections having elongated slots extending from substantially their central portions through the other ends of said sections and being parallel with the opposite flat side faces of the sections, auxiliary sections or tongues of substantially half the length of the major sections and being pivotally mounted in said slots at the ends of the major sections and being receivable in said slots when the major sections are closed or opened, the bottoms of the slots adjacent the ends of the major sections being cut away, to permit the auxiliary sections to engage through said cut away portions, said auxiliary sections adapted to extend in either direction laterally from the edges of the ends of the major sections, whereby the auxiliary sections may be used as inside or outside calipers.

In testimony whereof I hereunto affix my signature.

LOUIS J. ENGLUND.